US010540434B2

(12) United States Patent
Migeon et al.

(10) Patent No.: US 10,540,434 B2
(45) Date of Patent: Jan. 21, 2020

(54) DYNAMIC DISAGGREGATION AND AGGREGATION OF SPREADSHEET DATA

(71) Applicant: Business Objects Software, Ltd., Dublin (IE)

(72) Inventors: Florent Migeon, Clichy (FR); Sebastien Lavoignat, Droue sur Drouette (FR)

(73) Assignee: Business Objects Software Limited, Dublin (IE)

( * ) Notice: Subject to any disclaimer, the term of this patent is extended or adjusted under 35 U.S.C. 154(b) by 61 days.

(21) Appl. No.: 15/057,355

(22) Filed: Mar. 1, 2016

(65) Prior Publication Data
US 2017/0255608 A1    Sep. 7, 2017

(51) Int. Cl.
*G06F 17/24*    (2006.01)

(52) U.S. Cl.
CPC .............................. *G06F 17/246* (2013.01)

(58) Field of Classification Search
CPC .. G06F 17/246; G06F 17/2705; G06F 17/215; G06F 17/11; G06F 17/243; G06Q 30/0215; H04W 4/14
See application file for complete search history.

(56) References Cited

U.S. PATENT DOCUMENTS

| | | | | |
|---|---|---|---|---|
| 2006/0107196 A1* | 5/2006 | Thanu | ................... | G06F 17/246 715/217 |
| 2007/0061344 A1* | 3/2007 | Dickerman | ........... | G06F 17/246 |
| 2011/0307509 A1* | 12/2011 | Hsiao | ..................... | G06Q 30/02 707/769 |
| 2012/0144284 A1* | 6/2012 | Le Brazidec | ......... | G06F 17/246 715/219 |
| 2015/0378977 A1* | 12/2015 | Moharir | ................ | G06F 17/246 715/219 |
| 2015/0378978 A1* | 12/2015 | Gross | .................... | G06F 17/243 715/219 |

OTHER PUBLICATIONS

Jeff Lenning, "Excel Formula to Allocate an Amount into Monthly columns", Date: Sep. 26, 2013, pp. 1-20 (Year: 2013).*

* cited by examiner

*Primary Examiner* — Wilson W Tsui
(74) *Attorney, Agent, or Firm* — Mintz Levin Cohn Ferris Glovsky and Popeo, P.C.

(57) ABSTRACT

A computer-implemented method for disaggregating data in a spreadsheet or other data structure hosted on a client computing device includes providing an analyzer module as a plug-in or add-in to a spreadsheet application on a client computing device. The analyzer module locally performs disaggregation and aggregation processes on data in the spreadsheet on the client computing device. The method includes parsing, by the analyzer module, content entered in a subject cell of the spreadsheet to determine if sets of special syntax characters corresponding to a disaggregation instruction or command precede an amount in the entered content, and accordingly disaggregating or aggregating data in the spreadsheet.

16 Claims, 11 Drawing Sheets

1090
When one or more child nodes are present, identifying and obtaining a count of the number of rows of the spreadsheet in which the child nodes of the subject hierarchy node are present

↓

1100
When the special characters parsed by the analyzer module from the entered content are only the set of special characters (e.g. ">>//") corresponding to the instruction for even or uniform disaggregation, dividing the entered amount by the count of the number of rows of the spreadsheet in which the child nodes of the subject hierarchy node are present and placing the result in each of the child nodes of the subject hierarchy node

↓

1110
Automatically generating and replacing the entered amount in the subject hierarchy node by formula (e.g., a "SUM over all child nodes" formula)

↓

1120
When the special characters parsed by the analyzer module from the entered content include the set of special characters corresponding to the instruction for proportional or weighted disaggregation, locating the reference node, child nodes of the reference node, and an existing disaggregation ("reference disaggregation") of the reference node over child nodes of the reference node

↓

1130
Determining a ratio of each reference child node value to the reference node value for each reference child node in the existing disaggregation of the reference node

↓

1140
Using the determined ratios for the reference child nodes in the reference disaggregation to determine weights for a weighted or proportional disaggregation of the entered amount over the identified child nodes of the subject hierarchy node

1150
Automatically generating and inserting a formula for each identified child node of the subject hierarchy node

DYNAMIC DISAGGREGATION AND AGGREGATION OF SPREADSHEET DATA

BACKGROUND

A business information, business intelligence, and/or enterprise system can improve an organization's ability to monitor and manage data in a complex business environment. Such a system (e.g., a system offered by Business Objects SA of Levallois-Perret, France and SAP SE of Walldorf, Germany) can provide applications and tools that allow users to monitor, retrieve, view and manipulate business information, including business warehouse data stored and maintained as part of an organization's business operations. The business information may, for example, be associated with a number of different product lines, profit values, customer groups, fiscal years, distribution regions, product costs, product quantities, revenues, and/or dates. The business information may be stored in, and retrieved from, a variety of "data sources" (e.g., relational, transactional, hierarchical, multidimensional (e.g., OLAP), object oriented databases, etc.). Further, the data sources may include tabular data (e.g., spreadsheets, delimited text files), data tagged with a markup language (e.g., XML data), transactional data, unstructured data (e.g., text files, screen scrapings), hierarchical data (e.g., data in a file system, XML data), files, reports, documents, etc. and any other data source accessible through an established protocol (e.g., Open DataBase Connectivity (ODBC)).

A spreadsheet is a table of values placed in cells arranged in rows and columns. Each value/cell may have a predefined relationship to the other values/cells. Spreadsheet applications (sometimes referred to simply as spreadsheets) are computer programs (e.g., Appleworks™, Microsoft Excel™, Lotus 1-2-3™, Google Spreadsheets™, etc.) which allow a user to create and manipulate spreadsheets electronically.

An example spreadsheet application or tool may be configured to allow a user to, for example, retrieve stored information from a data source and manipulate, analyze or process the information (e.g., to create a display or report). The user may, for example, import a particular set of information into the spreadsheet application by entering a name or identifier into various cells of a spreadsheet to define what information should be associated with the cells, rows, and/or columns of the spreadsheet. For example, the user may associate a particular row with a measure such as profit or cost and a number of columns with different fiscal years, where the years are associated with a dimension.

Relationships between cells in a spreadsheet may be defined by formulas, which often can be complex. The complexity of the relationships between cells may make manipulation and visualization of the data in the spreadsheet cumbersome.

Consideration is now being given to systems and methods for incorporation, manipulation and visualization of data in a spreadsheet.

SUMMARY

In a general aspect, a computing device includes a memory and a semiconductor-based processor which form one or more logic circuits to host a spreadsheet application configured to process a spreadsheet or other data structures, and an analyzer module. The analyzer module is coupled to the spreadsheet, for example, as an add-in or plug-in component of the spreadsheet application. The analyzer module parses content entered in a subject cell of the spreadsheet to determine if sets of special syntax characters corresponding to a disaggregation instruction or command precede an amount in the entered content, and accordingly locally performs, on the computing device, disaggregation and aggregation processes on data in the spreadsheet.

In an aspect, the sets of special syntax characters corresponding to a disaggregation instruction or command correspond to an instruction for even disaggregation, or an instruction for proportional disaggregation with proportions corresponding to a reference disaggregation of a reference node, which is existing in the spreadsheet.

In an aspect, the analyzer module, when the content entered in the subject cell does not include the sets of special syntax characters corresponding to a disaggregation instruction or command, places the amount as the value of the subject cell in the spreadsheet.

In a further aspect, the analyzer module, when the content entered in the subject cell includes a set of special syntax characters corresponding to a disaggregation instruction or command, initiates processes to disaggregate the amount in the content entered in the subject cell.

In an additional aspect, the analyzer module, when the special characters parsed by the analyzer module from the entered content include a set of special characters corresponding to an instruction for proportional disaggregation, locates a reference node, child nodes of the reference node, and an existing disaggregation ("reference disaggregation") of the reference node over child nodes of the reference node in the spreadsheet. Then, the analyzer module determines a ratio of each reference child node value to the reference node value for each reference child node in the existing disaggregation of the reference node, and uses the determined ratios for the reference child nodes in the reference disaggregation to determine weights for a proportional disaggregation of the entered amount over the identified child nodes of the subject hierarchy node.

The details of one or more implementations are set forth in the accompanying drawings and the description below. Further features of the disclosed subject matter, its nature and various advantages will be more apparent from the accompanying drawings the following detailed description, and the claims.

BRIEF DESCRIPTION OF THE DRAWINGS

FIG. 4 illustrates a portion of an example spreadsheet, in accordance with the principles of the present disclosure.

FIG. 6 illustrates a portion of an example spreadsheet, in accordance with the principles of the present disclosure.

FIG. 8 illustrates a portion of an example spreadsheet, in accordance with the principles of the present disclosure.

FIG. 9 illustrates a portion of an example spreadsheet, in accordance with the principles of the present disclosure.

DETAILED DESCRIPTION

Systems and methods (collectively "spreadsheet solutions") for aggregating or disaggregating data included or displayed in a spreadsheet on a client computer are described herein.

In accordance with the principles of the present disclosure, a spreadsheet solution may involve an analyzer module to process cell values in the spreadsheet locally on the client computer in response to syntax entered in a subject cell of the spreadsheet. The analyzer module may be configured to be activated in response to alphanumeric commands or instructions entered, for example, via a local keyboard or other input device. The analyzer module may, for example, be configured to, upon activation via the local keyboard, locally perform aggregation or disaggregation operations on the data in the cells included or displayed in the spreadsheet on the client computer. The analyzer module (which may be coupled to a local spreadsheet application) may be configured to automatically process data in cells (e.g., OLAP hierarchy nodes) of the spreadsheet locally on the client computer without recourse to server-side solutions or operations for processing the data in the cells. Use of the analyzer module on the client computer may not require a specific visual graphical user interface (which may conflict or overlap in space with the visual display of the spreadsheet on the client computer display screen) as the analyzer module can be user activated via the local keyboard or other input device.

Figure 1:
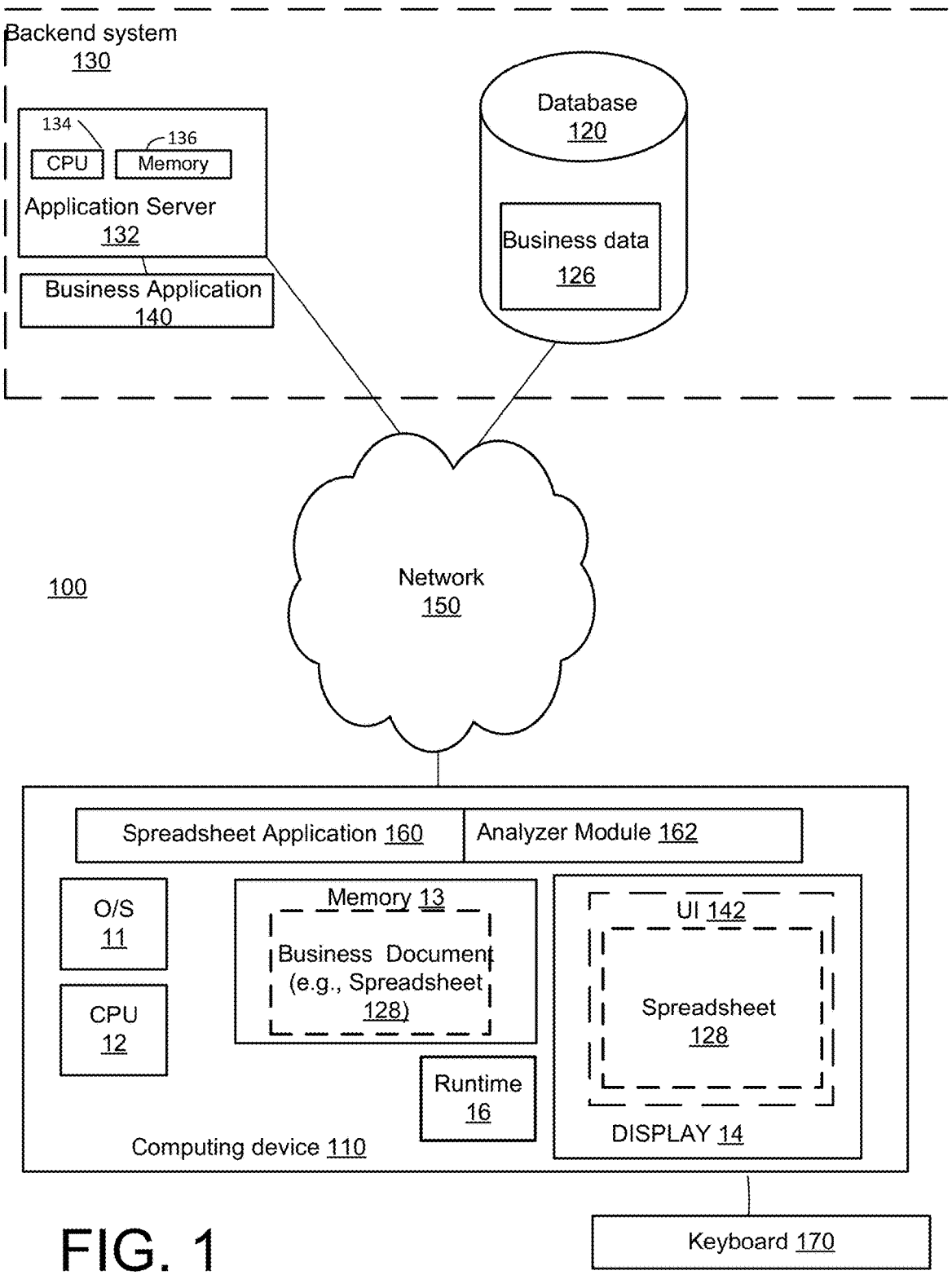
FIG. 1 is a schematic block diagram of an example system which may be used to implement a spreadsheet solution, in accordance with the principles of the present disclosure.

FIG. 1 shows a schematic block diagram of an example system 100, which may be used to implement a spreadsheet solution, in accordance with the principles of the present disclosure. System 100, as described herein, may include traditional arrangements, for example, for extracting business intelligence information from business data stored in remote databases.

System 100 may include a backend computer system 130, which includes an application server 132 and one or more databases (e.g., database 120, which for convenience is shown as a single database in the figure but may be a collection of different databases). In industrial or commercial implementations, business data 126 stored in database 120 may, for example, be updated or refreshed periodically (e.g., bank transaction data may be updated nightly, financial reporting data may be updated monthly or quarterly, etc.).

Application server 132 may, for example, host a business application 140, and may be connected to one or more client computing devices (e.g., a client computing device 110) via a computer network or the Internet (e.g., network 150). Business application 140 may have a frontend (e.g., UI 142, which may include frontend delivery vehicles, application agents, web browsers, etc.) presented on client computing device 110 through which a user can operate or interact with business application 140. Application server 132 may include one or more CPUs and memories (e.g., CPU 134 and memory 136), which may be configured to deliver, for example, various content (e.g., business data 126, business reports or documents (e.g., spreadsheet 128), application agents, web browsers, frontend user interface (UI 142), data storage, etc.) to client computing devices (e.g., client computing device 110) via a computer network 150 or the Internet.

A client computing device (e.g., client computing device 110) may, for example, be a desktop computer, a notebook computer, a netbook computer, a tablet computer, a smartphone or another mobile computing device, etc. An example client computing device (e.g., client computing device 110) may include an operating system (e.g., O/S 11), one or more processors (e.g., CPU 12), one or more memories or data stores (e.g., memory 13), a display (e.g., display 14) and one or more input devices (e.g., keyboard 170). Client computing device 110 may execute a runtime 16 and various applications (e.g., a web application, a word processing application, a spreadsheet application 160, business application 140 agents, etc.) to process locally stored data (e.g., spreadsheet 128), for example, for business application 140. Application server 132/business application 140 may provide business intelligence tools (e.g., spreadsheets, reporting and querying software: tools that extract, sort, summarize, and present selected data, OLAP: Online analytical processing tools, etc.) on client computing device 110 for querying, manipulating or processing business data (e.g., business data 126 stored in database 120).

In example implementations of the spreadsheet solution describe herein, client computing device 110 may include an analyzer module 162. Analyzer module may be configured to locally process the data included in spreadsheets (e.g., spreadsheet 128), which may be stored locally (e.g., in memory 13) or displayed locally (e.g., in UI 142). In example implementations, analyzer module 162 may, for example, be coupled to spreadsheet application 160 as an add-in or plug-in component of the spreadsheet application.

In example implementations, analyzer module 162 may be configured to locally perform aggregation and/or disaggregation operations on the data stored or shown in spreadsheet 128 in client computing device 110. Analyzer module 162 may be configured to perform the aggregation and/or disaggregation functions on spreadsheet 128, for example, in response to an instruction, identifier or keyword (e.g., a text string) entered into a spreadsheet cell via keyboard 170.

For purposes of illustration, an example spreadsheet 128 may relate to or include business data (e.g., business data 126) generated or created during a financial planning process of an organization or business. The spreadsheet may, for example, include financial values or currency amounts in corresponding cells for various time periods, product lines, cost centers, regions, etc. The spreadsheet may include cells with financial values or currency amounts which represent summaries or analysis results of the data in other cells for various time periods, product lines, cost centers, etc. Conversely, the spreadsheet may include cells with financial values or currency amounts which represent portions or parts of the financial value or currency amount in another cell. The values in the various cells may have various relationships (e.g., proportional, sum, difference, etc.) to each other defined by various rules or formula. In an example scenario, which for example involves financial data of an entity, the spreadsheet may involve a large number of formulas or a complex set of formulas. Maintaining the spreadsheet manually in such a scenario with a large number of formulas or a complex set of formula may involve long, complex and cumbersome tasks, which may be susceptible or prone to errors when performed, for example, manually by a user.

Aggregation operations may involve processes by which key figure values on the lowest level of detail in spreadsheet 128 are summed at run time and displayed or planned on a high level; for example, if a cell of spreadsheet 128 shows an aggregation of forecasted demand for a region, what may be displayed as the aggregate is the forecasted demand for all of the different sales channels, product families, brands, products, and customers in that region which analyzer module 162 has added together.

Disaggregation (or splitting) operations may involve processes by which a key figure value on a high level is broken or split down to the detailed lower levels; for example, if a cell of spreadsheet 128 shows a number for forecasted demand for a particular region, analyzer module 162 may split up this number among the different sales channels, product families, brands, products, customers, etc., in the particular region.

Analyzer module 126 may also store and/or recognize information in cells using pre-determined types of formulas. For example, the analyzer module 120 might store and/or recognize the following type of formula in spreadsheet cells: =AnalyzerOLAPMember(fullName,displayName) where displayName is a string representing what should be shown on the user's display and fullName defines where the information is actually stored in an OLAP cube. The full name may correspond to an element in the metadata model associated with the OLAP cube. By way of example only, a particular cell might contain the formula: =AnalyzerOLAPMember("[Region].[Europe].[France]","France") Note that such a formula might include other parameters, such as a unique identifier associated with the data (e.g., a unique alphanumeric string that might be used to correlate information even when a display name and/or full name has been changed), dimension information, hierarchy information, and/or metadata.

With reference to FIG. 1, spreadsheet 128 may be displayed, for example, by spreadsheet application 160 on UI 142 of computing device 110. Portions of an example spreadsheet 128 displayed in UI 142 are shown as spreadsheets 200-900 in FIGS. 2-9 for purposes of illustration of the operation of analyzer module 162, in accordance with the principles of the present disclosure.

As shown in the figures, example spreadsheets 200-900 include a table of cells (or nodes) arranged into rows (dimensions) and columns (measures). The cells in the table may be referred to by their X and Y locations. X locations, the columns, may be represented by letters, "A", "B", "C", etc., while rows may be represented by numbers, 1, 2, 3, etc. A single cell may be referred to by addressing its row and column, "D13" for instance.

Spreadsheets 200-900 include, for example, financial data (e.g., various costs for various time periods) of an entity or organization. In the example spreadsheets shown, the rows (e.g., rows 8-21) may represent costs (e.g., total costs, personal costs, bonus expense, etc., that are shown as row names in column B). Further, the columns may represent various time periods (e.g., year 2006, 2006 Q1, 2006 Q2, etc., which are shown as column headings in row 8). The financial data shown in a cell may be imported into the cells of spreadsheets 200-900 from the business databases (e.g., database 120), computed from relationship functions, or manually entered or edited by a user using spreadsheet application 160.

The financial data shown in the cells of spreadsheets 200-900 may have a multi-level hierarchical structure or schema (e.g., parent nodes-child nodes-grandchild nodes, etc.). Analyzer module 162 may be configured to recognize the multi-level hierarchical schema (parent nodes-child nodes, etc.) of spreadsheet 200-900 and the relationships (e.g. formulas) between various cells of the spreadsheet 128.

Figure 2:
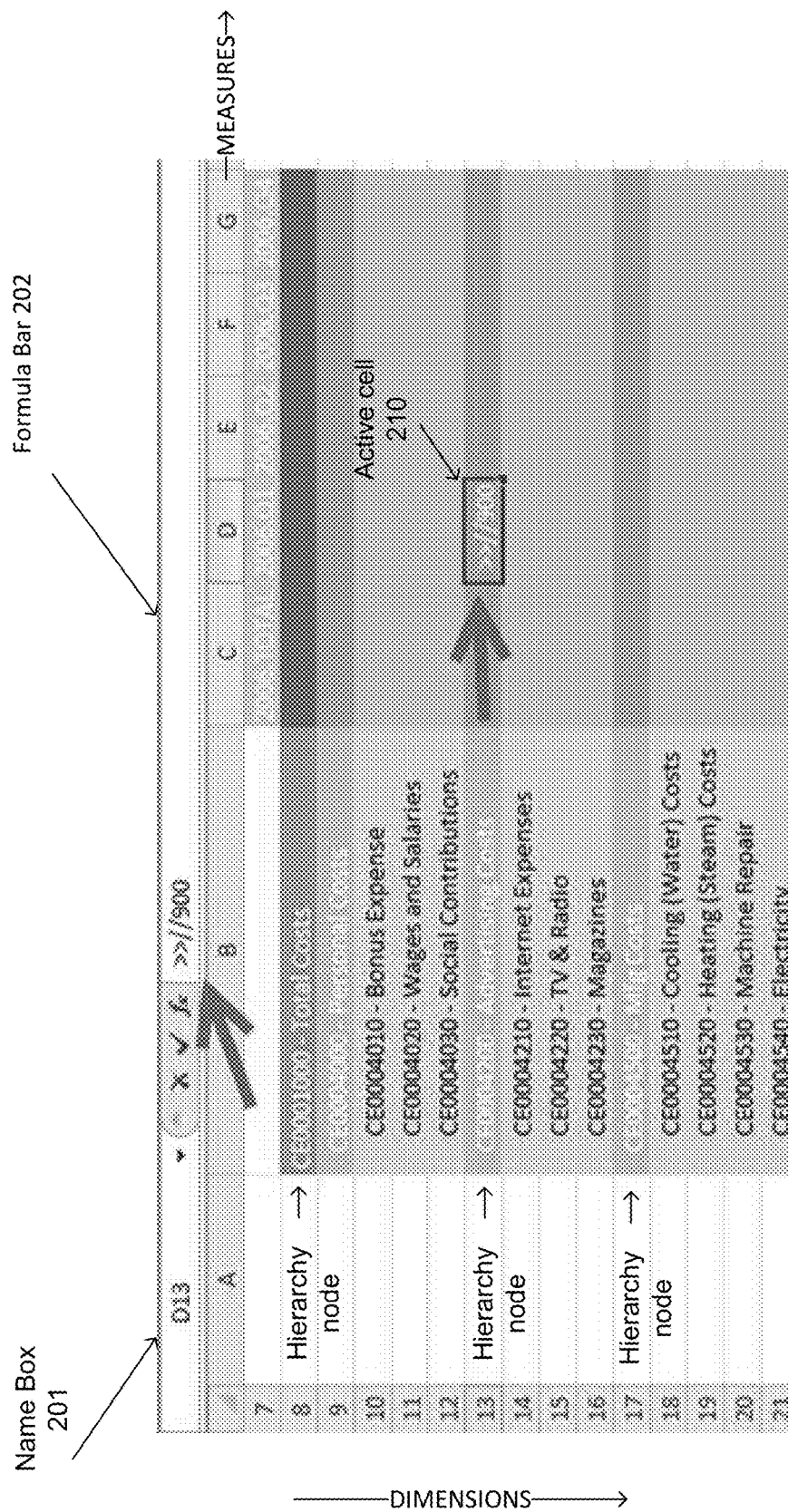
FIG. 2 illustrates a portion of an example spreadsheet, in accordance with the principles of the present disclosure.

With reference to FIG. 2, a user may reference or select an "active" cell (e.g., active cell 210, D13), for example, by clicking on cell or moving to the cell, or entering an address of the cell. Spreadsheet application 160 may highlight the active cell in the spreadsheet display (e.g., by color or bold borders). A name box (e.g., name box 201) may contain the address of the active cell. The user may navigate to another cell simply by entering the address of that cell in name box 201 and pressing the "enter" key (e.g., on keyboard 170). A formula bar (e.g., formula bar 202) may display the contents of the active cell. When the contents are a formula, the formula may appear in formula bar 202, while the value of the formula appears in the active cell. When the contents are a mere alphanumeric value or amount, the value may appear in formula bar 202 and also appears in the active cell.

Analyzer module 162 (e.g., in an OLAP-based environment) may be configured to automatically perform a disaggregation of an amount entered or typed on a hierarchy node (e.g., active cell 210). Analyzer module 162 may, for example, perform the disaggregation on-the-fly when the user has typed a special syntax in front of the hierarchy node. In addition or in contrast to simple disaggregation, which may involve displaying the value results of the disaggregation in each of the child nodes of the hierarchy node, in example implementations, analyzer module 162 may be configured to replace the typed content on the hierarchy node by a formula for the amount in the typed content. This feature of replacing the typed amount by a formula may make the disaggregation by analyzer module 162 dynamic, and enable automatic aggregation when new data is entered or typed in the child nodes or cells in spread sheet 128.

With reference to FIG. 2, analyzer module 162 may be configured to recognize special syntax characters or symbols (e.g., ">>") entered in active cell 210 as a trigger to automatically disaggregate an amount value entered in active cell 210.

Even or Equal Disaggregation

As an example, a user may enter content (e.g. ">>//900") in active cell 210 (D13) for the hierarchy node "Advertising Costs" and validate it in order to perform "on-the-fly" client-based disaggregation. The user's typed entry ">>//900," which may be shown in active cell 210 as it is being typed in, may also be shown in formula bar 202. Analyzer module 162 may recognize the syntax ">>" (preceding the amount "900") in the typed entry as an instruction or command to evenly or equally disaggregate the amount "900" (entered after the delimiter "//") entered in the hierarchy node "Advertising Costs" (D13) over child nodes. Analyzer module 162 may, for example, disaggregate the amount "900" evenly over child nodes D14, D15 and D16 (corresponding to "Internet Expenses," "TV & Radio," and "Magazines," respectively).

Figure 3:
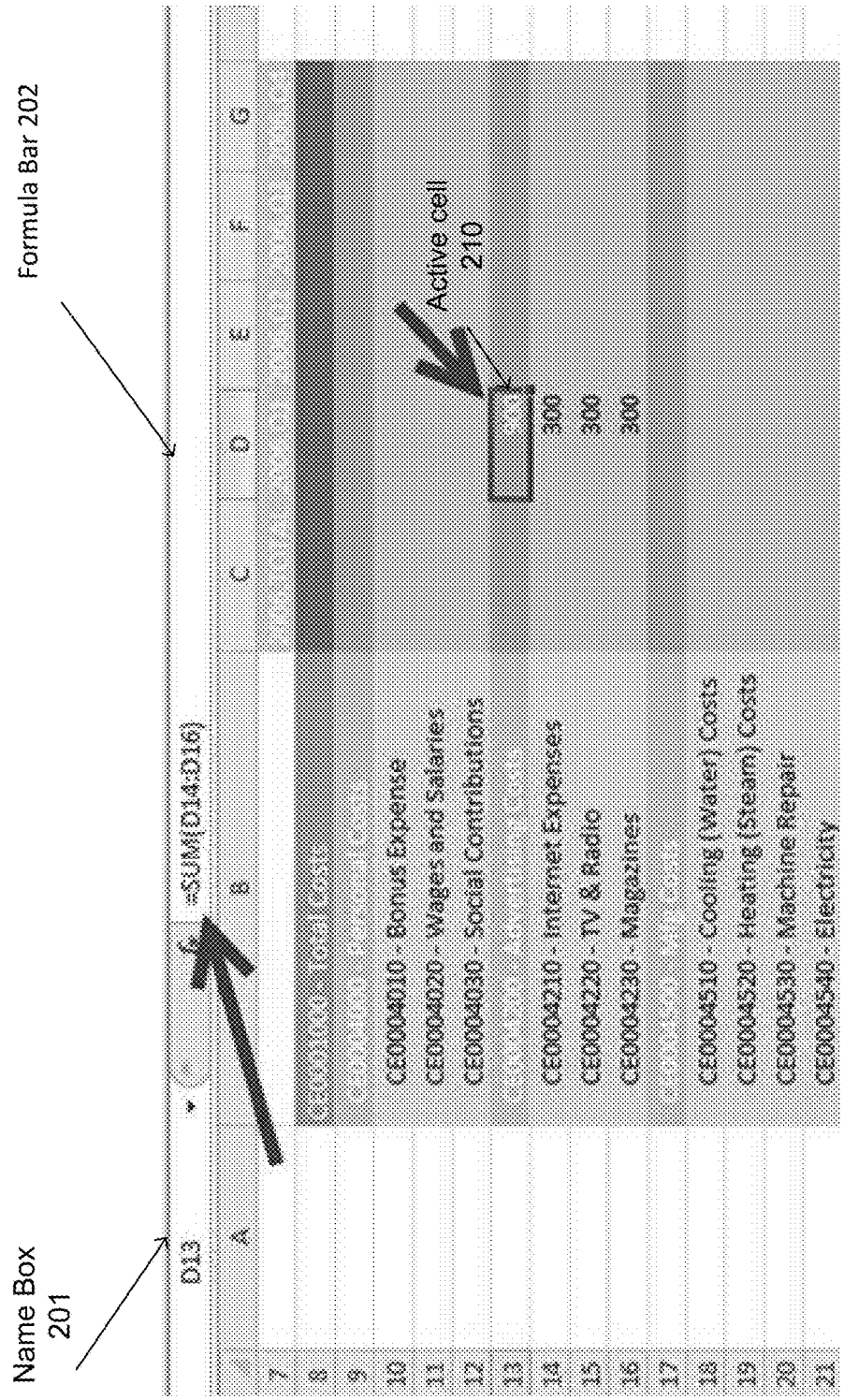
FIG. 3 illustrates a portion of an example spreadsheet, in accordance with the principles of the present disclosure.

FIG. 3 shows, for example, a result of an on-the-fly disaggregation. As shown in the figure, analyzer module 162 using client-based disaggregation processes may automatically insert or display even or equal disaggregation amounts or values of "300," "300" and "300" in the child nodes (i.e. cells D14, D15 and D16, respectively).

Replacement of Node Values by Formulas for Automatic Aggregation

Further, as shown in the figure, analyzer module 162 may also automatically replace the content ">>//900" entered in active cell 210 by a "SUM" formula (e.g., "SUM (D14: D16)" as shown in formula bar 202), while active cell 210 (D13) displays the value of the formula (i.e. "900").

The replacement of the entered text in active cell 210 (D13) by a formula by analyzer module 162 may enable dynamic client-based aggregation in spreadsheet 200. When a value of a child node or cell (e.g., D14, D15, or D16) is changed, the change may be automatically aggregated to the parent node or cell (i.e. D13) on the client computer because the parent node or cell value is defined by the formula (e.g., SUM (D14:D16)) provided by analyzer module 162.

Figure 4:
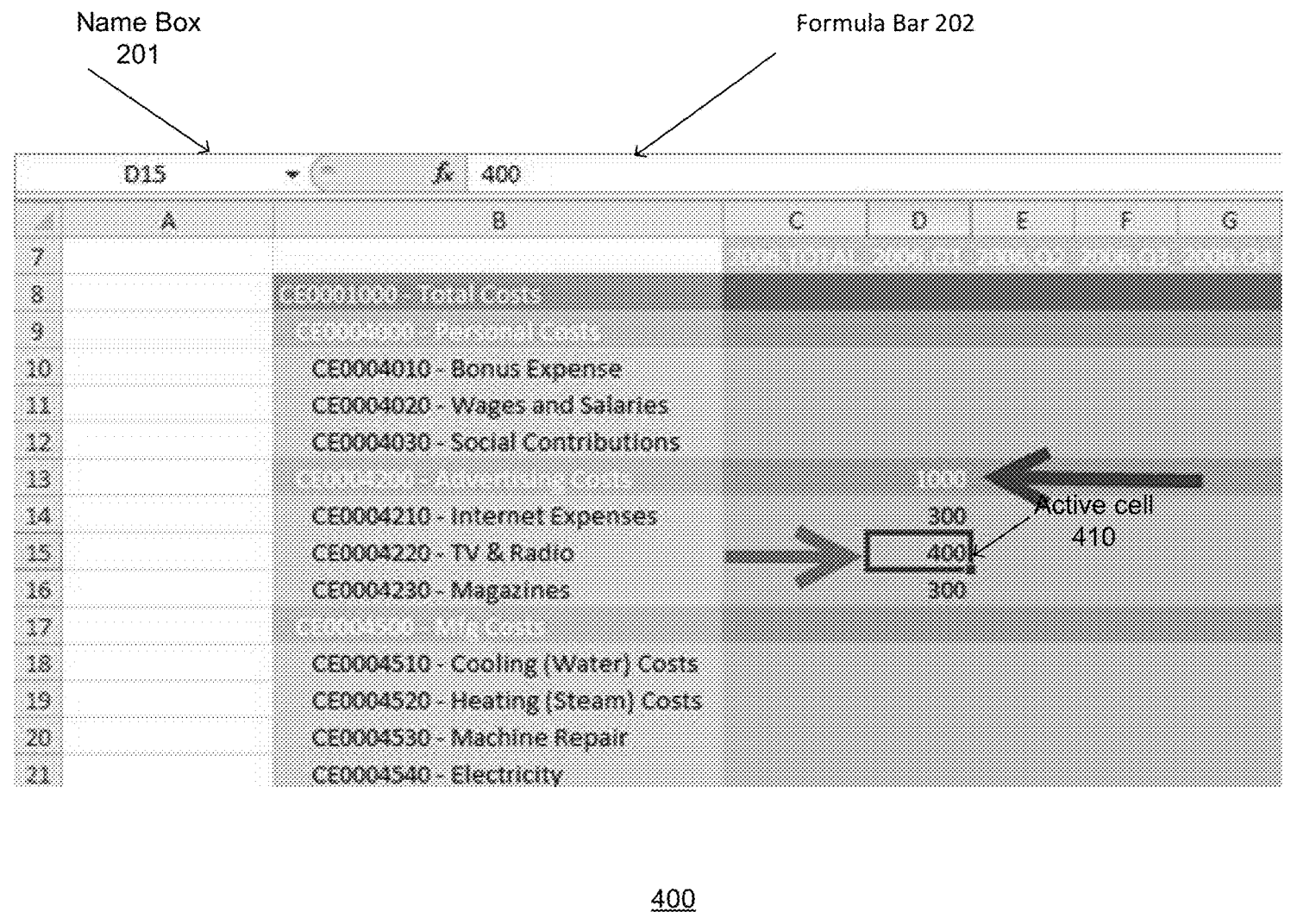

FIG. 4 shows an example instance of automatic aggregation to the parent node or cell (i.e. D13), in accordance with the principles of the present disclosure. In the example instance, the user may change the disaggregated value of 300 in cell D15 (FIG. 3) to "400." This change may be automatically aggregated to the parent node or cell (i.e. D13) through the formula (e.g., SUM (D14:D16)) provided by analyzer module 162 for cell D13. As shown in FIG. 4, the value of the parent node or cell D13 automatically changes to a value of "1000" from the previous value of "900" when the value of child cell D15 is changed to "400."

Weighted or Proportional Disaggregation

The foregoing disaggregation example (FIGS. 2-3) demonstrates an instance of even or equal disaggregation in which the value (e.g., "900") in parent node or cell D13 is evenly divided or distributed (e.g., as disaggregated value "300") across the three child cells D14, D15 and D16 by analyzer module 162 in response to the syntax ">>" entered in the parent node.

In another example implementation, analyzer module 162 may be configured to perform "weighted" or proportional disaggregation using, for example, an instance of another parent node ("reference node") disaggregation for reference. The reference node may be identified or specified by additional identifiers in the syntax entered in an active cell to initiate automatic client-based disaggregation. For example, analyzer module 162 may be configured to recognize the syntax ">>//"reference node identifier"//amount" entered in the active cell as a command or instruction to disaggregate the amount in the active cell over its child cells in the same manner or proportions as an existing instance of disaggregation of the reference node. The reference node may be identified, for example, by its location (row, column) in the spreadsheet. In example instances, where the reference node is in the same row as the active cell in the spreadsheet, the reference node identifier may be merely the column identifier of the reference node.

Figure 5:
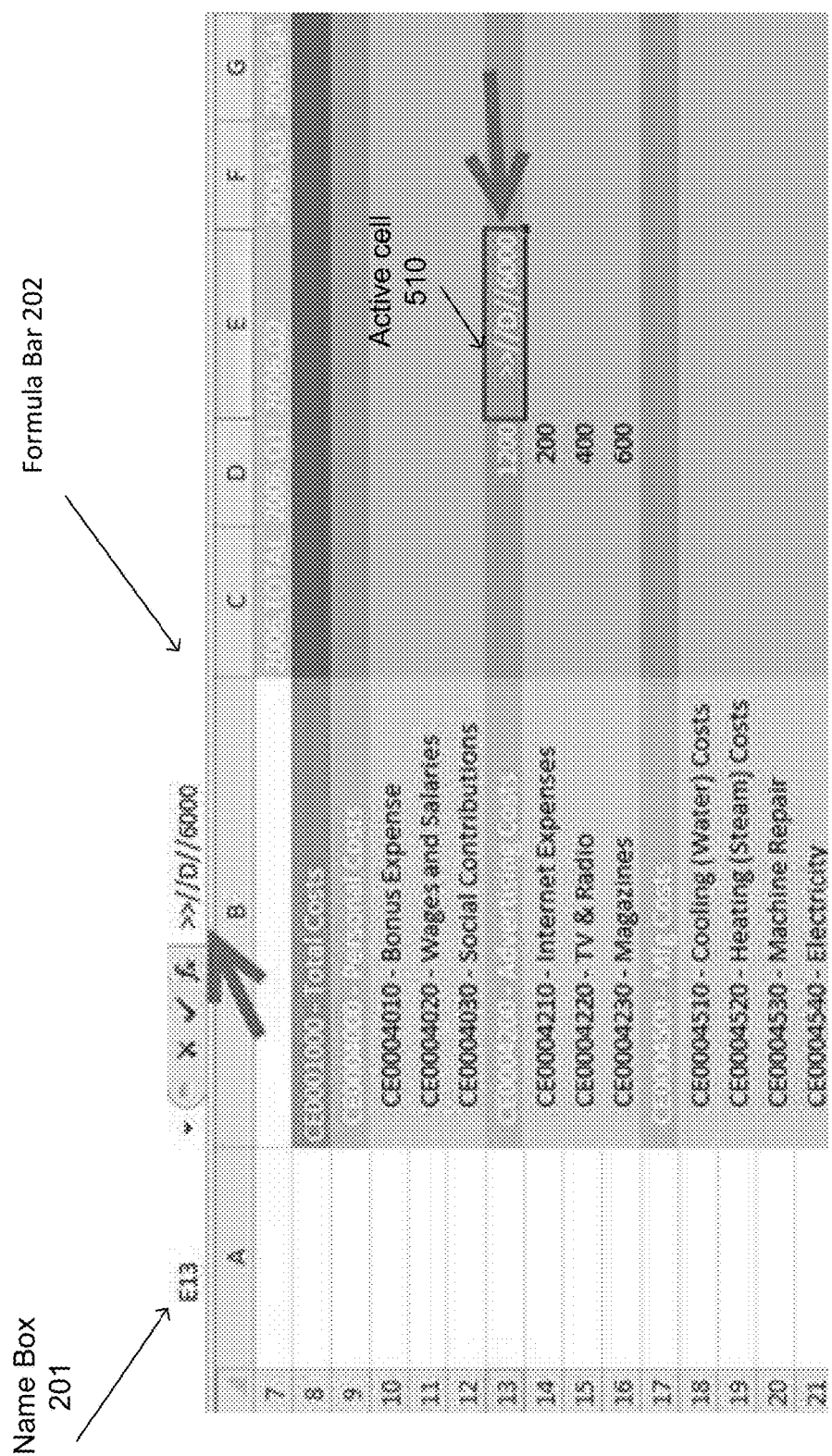
FIG. 5 illustrates a portion of an example spreadsheet, in accordance with the principles of the present disclosure.
Figure 6:
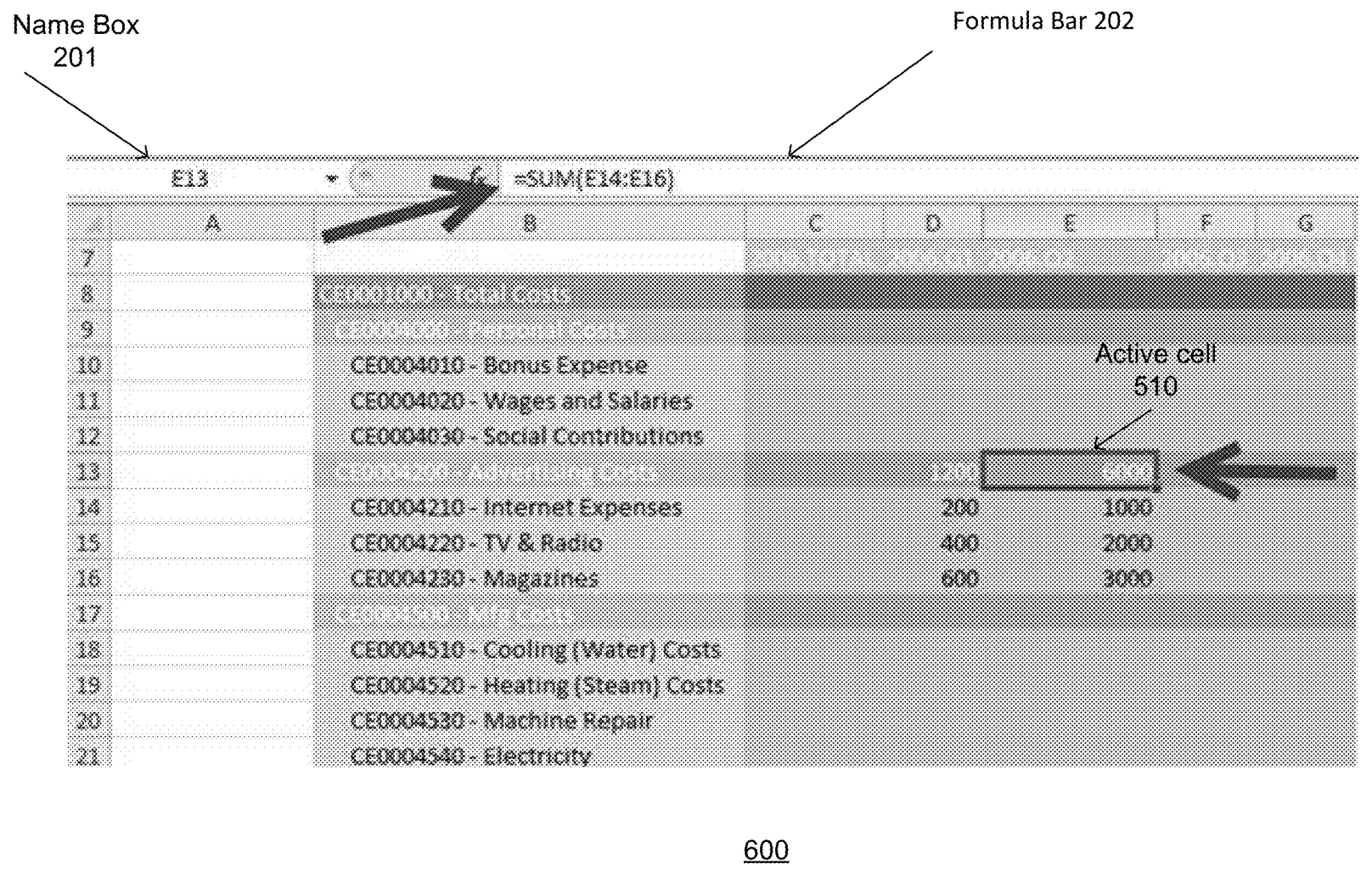

FIGS. 5 and 6 show an example of weighted disaggregation in which an active cell (e.g., E13) is disaggregated by analyzer module 162 using the same proportions as an existing disaggregation of a reference node (e.g., D13).

As shown in FIG. 5, in order to disaggregate a value (e.g., "6000") of the hierarchy node E13 (i.e. "Advertising Costs" for 2006.Q2 quarter) based on the actual disaggregation data already available for a reference node D13 (i.e. the previous 2006.Q1 quarter in column D), a user may type type ">>//D//6000" in active cell 310 (E13) and validate it in order to perform "on the fly" client-based weighted disaggregation.

As shown in FIG. 6, analyzer module 162, using client-based disaggregation processes, may automatically insert or display weighted disaggregation amounts or values "1000," "2000" and "3000" in the child nodes (i.e. cells E14, E15 and E16, respectively) of active cell 310 (E13) with the child node proportions or weights being determined by the existing disaggregation instance (e.g., D14=200, D15=400, D16=600) of the value (e.g., 1200) of reference node D13 in column D.

Replacement of Node Values by Formulas for Automatic Aggregation

Further, as shown in the figure, analyzer module 162 (as in the case shown in FIG. 2) may automatically replace the text (e.g., ">>//D//6000") entered in active cell 510 by a "SUM" formula (e.g., "SUM (E14:E16") as shown in formula bar 202, while active cell 510 displays the value of the formula (i.e. "6000").

Figure 7:
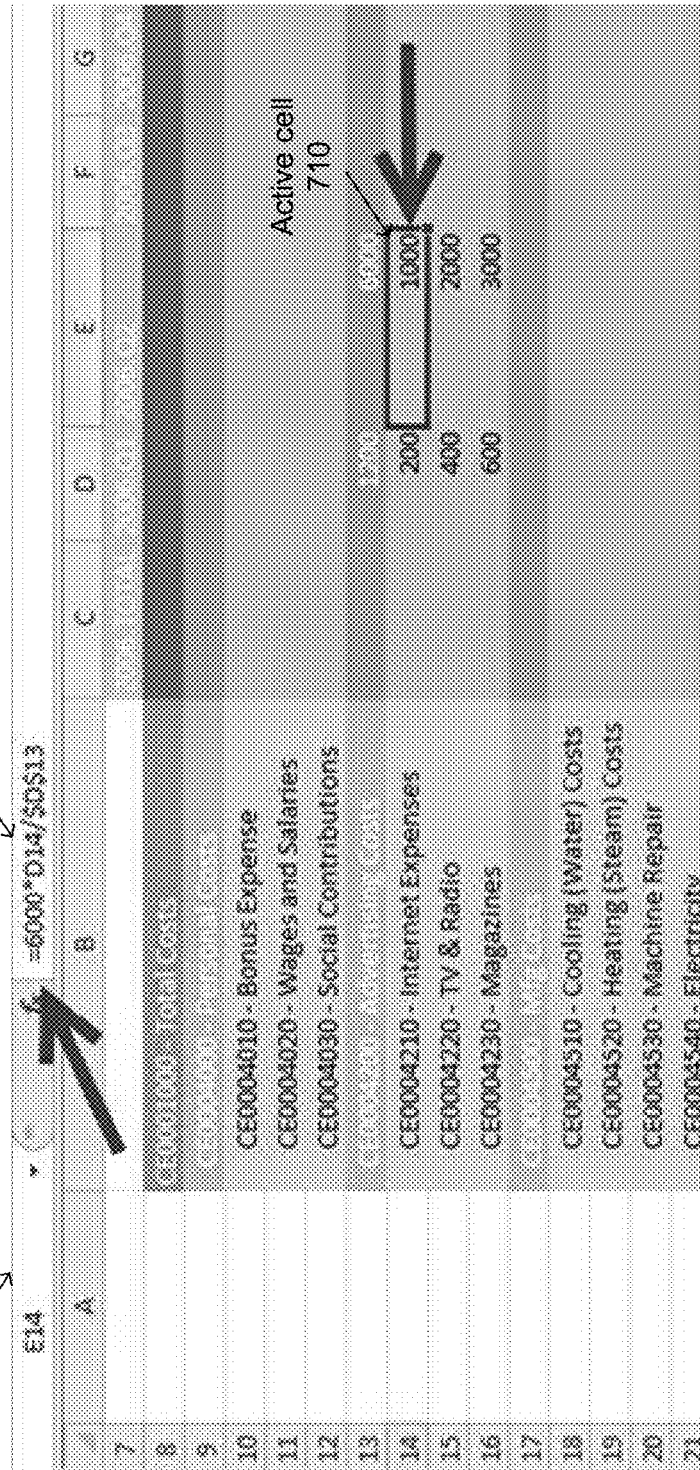
FIG. 7 illustrates a portion of an example spreadsheet, in accordance with the principles of the present disclosure.

Analyzer module 162, for the case of weighted disaggregation, may be further configured to insert formulas for the child nodes (e.g., cells E14, E15 and E16) with the child node proportions or weights being determined by the existing disaggregation instance of the reference node (e.g., D13). FIG. 7 shows, for example, a formula "E13*D14/$D$13"), which may be written by analyzer module 162 in formula bar 202 for the value of child node (E14, active cell 710). These formulas may allow automatic or dynamic reweighing of the weighted disaggregation for the child nodes (e.g., cells E14, E15 and E16) when values of the existing reference node disaggregation change.

Figure 8:
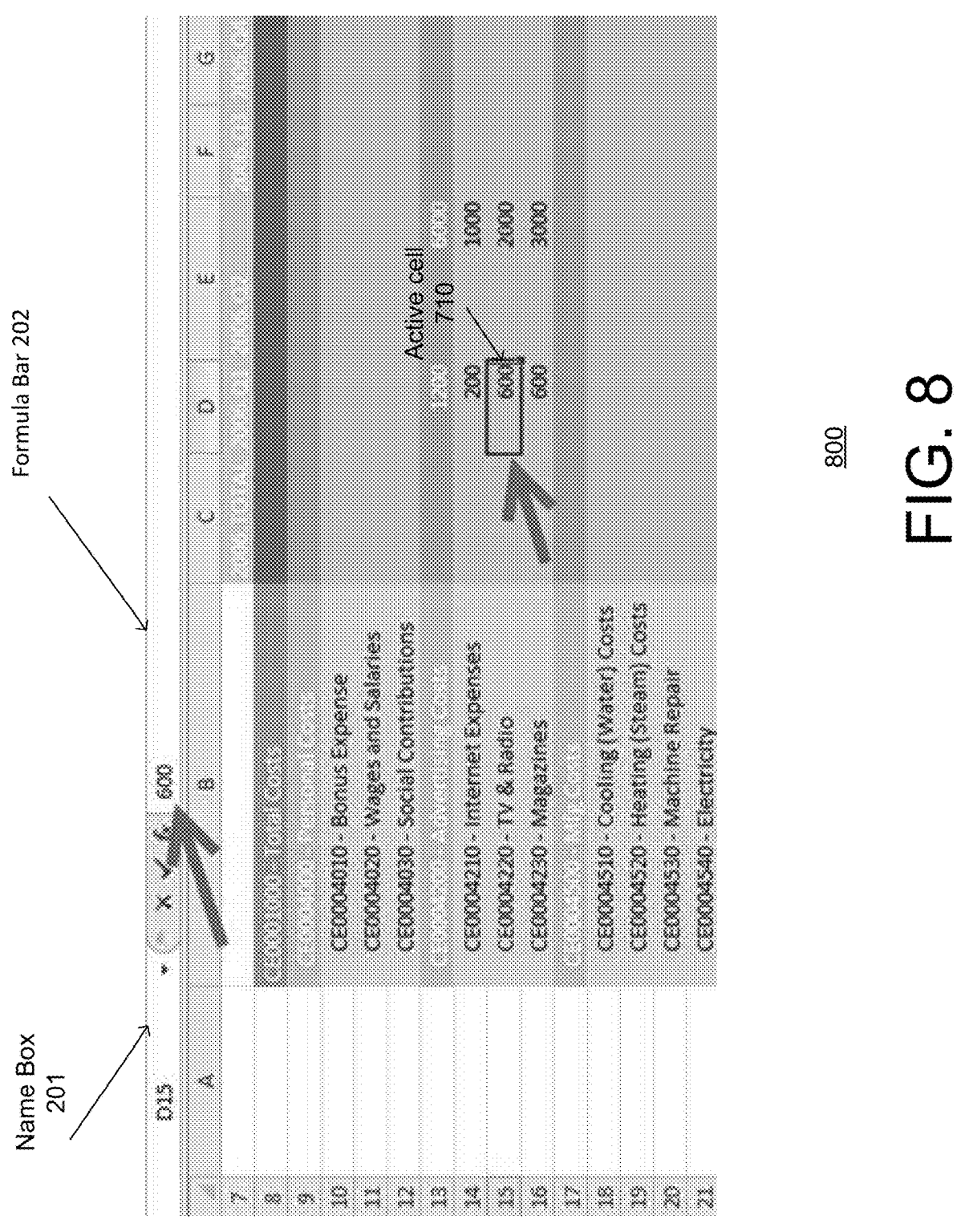
Figure 9:
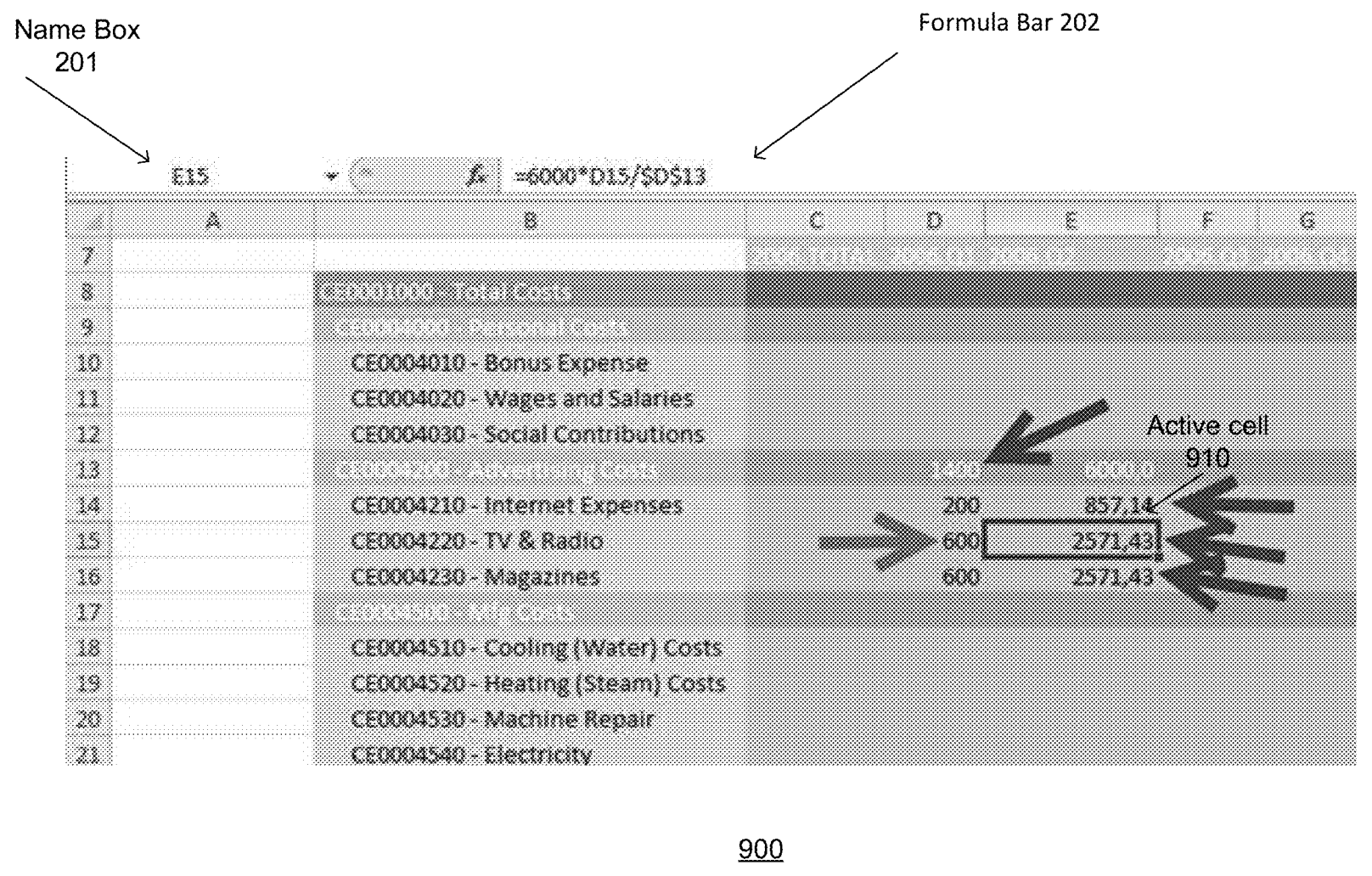

FIGS. 8 and 9 show an example automatic or dynamic reweighing of the weighted disaggregation for the child nodes (e.g., cells E14, E15 and E16) (FIG. 7) when values of the reference node disaggregation are changed. As shown in the FIG. 8, the value of a child node (D15, active cell 810) may have changed to a new value of 600 compared to the previous value of 400 (FIG. 7). As a result the proportions of the reference node disaggregation for reference node D13 in column D are changed. As discussed with reference to FIG. 4, this change in the value of child node D15 is automatically aggregated to the parent node or cell (i.e. D13) through the formula (e.g., SUM (D14:D16)) provided by analyzer module 162 for cell D13. As shown in FIG. 9, the value of the parent node or cell D13 automatically changes to a value of "1200" from the previous value of "100" when the value of child cell D15 is changed to "600."

Further, because of the formulas written by analyzer module 162 for weighted disaggregation for the child nodes (e.g., cells E14, E15 and E16) (FIG. 7), the changing proportions of the reference node disaggregation may be automatically reflected and displayed in a reweighted disaggregation for the child nodes (e.g., cells E14, E15 and E16).

FIG. 9 shows, for example, a reweighted disaggregation of parent node E13 with new reweighted values for child nodes E14, E15 and E16. In particular, child node E15 (active node 910) is shown, for purposes of illustration, as having a reweighted value of "2571.43" automatically computed by the formula=D13*D15/$D$13 (shown in function bar 202), which was written by analyzer module 162 for child node E15 for the weighted disaggregation of parent node D13 as discussed above with reference to FIGS. 6 and 7.

Analyzer module 162 by automatically generating and placing formulas for the subject hierarchy node and/or child nodes (as illustrated by the foregoing examples FIGS. 2-9 enables dynamic updating of cell values in the spreadsheet whenever changes are made to a child node or a reference node value in the spreadsheet. Change or modification made to only one cell by a user can be automatically and dynamically propagated throughout the disaggregation or aggregation structures in the spreadsheet. This feature of analyzer 162 of automatically generating and inserting formulas for cell values (e.g., for the subject hierarchy node and/or child nodes) may substantially reduce maintenance cost and error risk associated with manual editing or insertion of formulas in the spreadsheet.

Further, analyzer module 162, by carrying out all disaggregation or aggregation operations locally on the client side, dispenses with a need to send data to a remote server for server-side disaggregation or aggregation operations each time a cell in the spreadsheet is changed or modified in the spreadsheet. By carrying out the disaggregation or aggregation operations on the client side, overhead costs of establishing or maintaining a data link to the remote sever and time delays associated with sending or receiving data from a remote server can be avoided. Analyzer module 162 can enhance user experience by providing disaggregation or aggregation results on the client computer quickly without a need to wait for server processing results.

Figure 10:
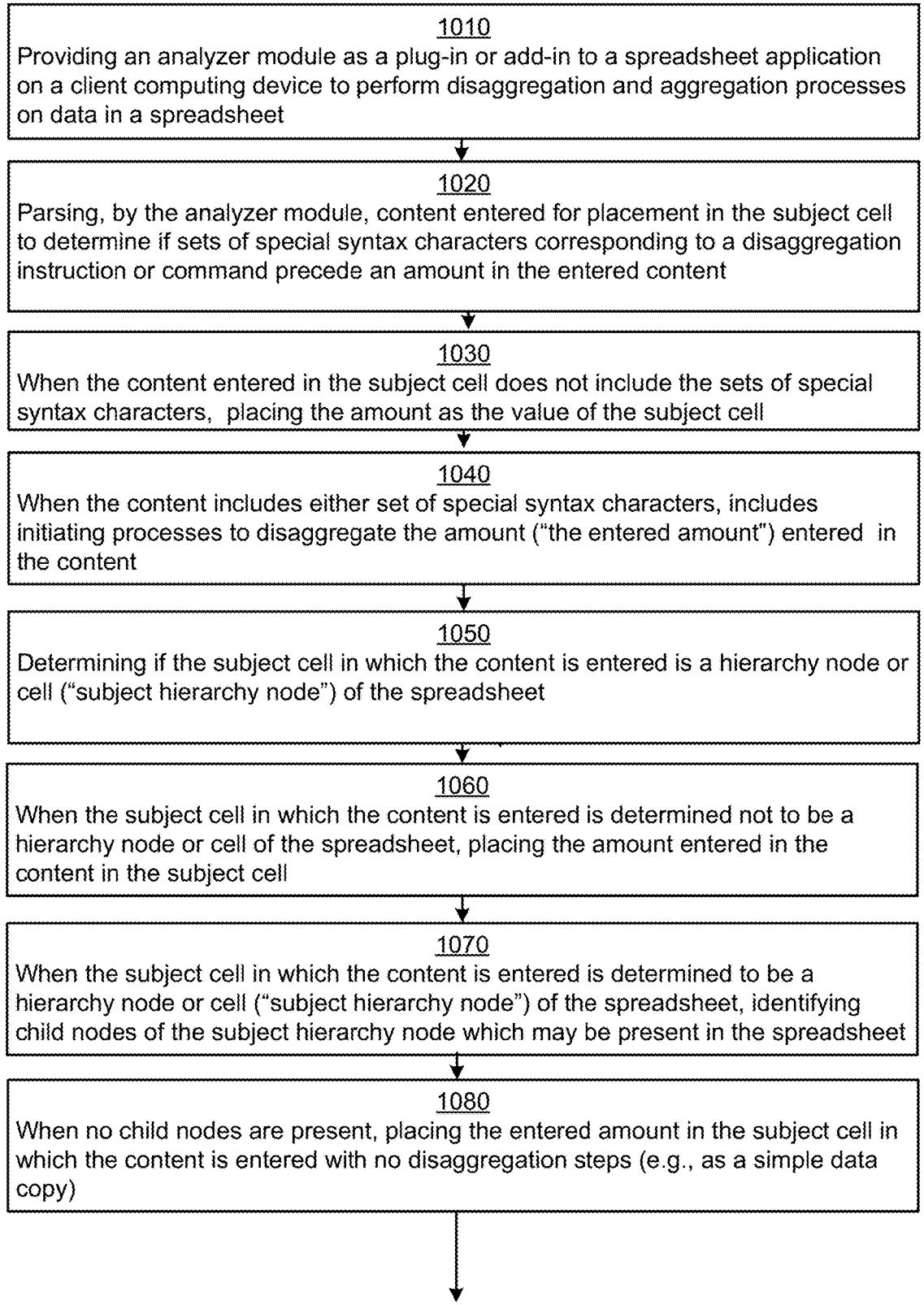
FIG. 10 illustrates an example method for automated client-side disaggregation of data in a spreadsheet on a client computing device, in accordance with the principles of the present disclosure.

FIG. 10 shows an example method 1000 for disaggregating data in a spreadsheet or other data structure in which a value of one or more cells in a hierarchy of cells can be represented by formulas. The spreadsheet or other data structure may be hosted on a client computing device. Method 1000 may be performed on the client side, for example, by an analyzer module provided as a plug-in or add-in to a spreadsheet application on the client computing device. The analyzer module may be configured to recognize special syntax characters (e.g., ">>" or ">>//"reference node identifier"//" in content, which may be entered or typed in a node or cell ("a subject cell") of the spreadsheet, as corresponding to a command or instruction to automatically disaggregate a value of the subject cell.

Method 1000 includes providing an analyzer module, for example, as a plug-in or add-in to a spreadsheet application on a client computing device, to perform client-based disaggregation and aggregation operations on data in a spreadsheet (1010).

Method 1000 further includes, parsing, by the analyzer module, content entered (e.g., via a key board) for placement in the subject cell to determine if sets of special syntax characters (e.g., ">>//") or ">>//"reference node identifier"//") corresponding to a disaggregation instruction or command precede an amount in the entered content (1020). The set of special syntax characters (e.g., ">>//") may correspond to an instruction for even or uniform disaggregation, while the set of characters ">>//"reference node identifier"//") may correspond to an instruction for weighted or proportional disaggregation of the subject cell with weights or proportions corresponding to a disaggregation ("reference disaggregation") of the reference node, which may be present or existing in the spreadsheet. The reference node identifier may, for example, be the column name of the reference node. The reference node may correspond to the same hierarchy level (e.g., the same row) as the subject cell in the spreadsheet.

When the content entered in the subject cell does not include the sets of special syntax characters, method 1000 includes placing the amount as the value of the subject cell (e.g., as a direct data copy) (1030). When the content includes either set of special syntax characters, method 1000 includes initiating processes to disaggregate the amount entered (e.g., after the last delimiter "//") in the content (1040).

Initiating processes to disaggregate the amount entered in the content 1040 may include determining if the subject cell in which the content is entered is a hierarchy node or cell ("subject hierarchy node") of the spreadsheet (1050). This may, for example, involve considering if the dimension member (e.g., row name) of the dimension (row axis) is a hierarchy node in the structure or schema of the spreadsheet.

When the subject cell in which the content is entered is determined not to be a hierarchy node or cell of the spreadsheet, method 1000 may include placing the amount entered in the content (e.g., after the last delimiter "//" in the content) in the subject cell (1060).

When the subject cell in which the content is entered is determined to be a hierarchy node or cell ("subject hierarchy node") of the spreadsheet, method 1000 may include identifying child nodes of the subject hierarchy node which may be present in the spreadsheet (1070). When no child nodes are present, method 1000 may include placing the entered amount in the subject cell in which the content is entered with no disaggregation steps (e.g., as a simple data copy) (1080).

When one or more child nodes are present, method 1000 may include identifying and obtaining a count of the number of rows of the spreadsheet in which the child nodes of the subject hierarchy node are present (1090).

When the special characters parsed by the analyzer module from the entered content at 1020 are only the set of special characters (e.g. ">>//") corresponding to the instruction for even or uniform disaggregation, method 1000 may include dividing the entered amount by the count of the number of rows of the spreadsheet in which the child nodes of the subject hierarchy node are present and placing the result in each of the child nodes of the subject hierarchy node (1100). Method 1000 may further include automatically generating and replacing the entered amount in the subject hierarchy node by a formula (e.g., a "SUM over all child nodes" formula) (1110).

When the special characters parsed by the analyzer module from the entered content at 1020 include the set of special characters corresponding to the instruction for proportional or weighted disaggregation (e.g., ">>//"reference node identifier"//"), method 1000 may include locating the reference node, all child nodes of the reference node, and an existing disaggregation ("reference disaggregation") of the reference node over child nodes of the reference node (1120). The child nodes of the reference node may correspond (e.g., in a one-to-one correspondence) to the child nodes of the subject hierarchy node or cell identified at 1070.

Method 1000 may include determining a ratio of each reference child node value to the reference node value for each reference child node in the existing disaggregation of the reference node (1130). Method 1000 may further include using the determined ratios for the reference child nodes in the reference disaggregation to determine weights for a weighted or proportional disaggregation of the entered amount over the identified child nodes of the subject hierarchy node (1140). For example, for the weighted or proportional disaggregation, the value of each identified child node of the subject hierarchy node may be determined by multiplying the entered amount by the ratio determined for the corresponding child node in the existing disaggregation of the reference node. In addition to replacing the entered amount in the subject hierarchy node by an automatically generated formula (e.g., a "SUM over all child nodes" formula) 1100, method 1000 may include automatically generating and inserting a formula for each identified child node of the subject hierarchy node (1150). These child node formulas may formally describe that the relationship of each identified child node and the subject hierarchy node should be the same as that of the corresponding child node and the reference node in the reference disaggregation. For example, a child node formula may be: child node value=subject hierarchy node value*(corresponding child node value/reference node value).

Using formulas for the subject hierarchy node and/or child nodes may allow dynamic updating of cell values in the spreadsheet whenever changes are made to a child node or a reference node value in the spreadsheet. Change or modification made to only one cell by a user can be automatically and dynamically propagated throughout the disaggregation or aggregation structures in the spreadsheet.

Using method 1000 to automatically generate and insert formulas for cell values (e.g., for the subject hierarchy node and/or child nodes) may substantially reduce maintenance cost and error risk associated with manual editing or insertion of formulas in the spreadsheet. As noted previously, method 1000 may be performed on the client side (e.g., using an analyzer module plug-in or add-in to the spreadsheet) on a client computing device. Method 1000 may be performed to automatically and dynamically conduct disaggregation or aggregation operations in response to a user change or modification to a single cell of the spread sheet.

Further, implementing method 1000 on the client side to carry out disaggregation and aggregation operations locally on the client side, dispenses with a need to send data to a remote server for server-side disaggregation or aggregation operations each time a cell in the spreadsheet is changed or modified in the spreadsheet. By carrying out the disaggregation or aggregation operations on the client side, overhead costs of establishing or maintaining a data link to the remote sever and time delays associated with sending or receiving data from a remote server can be avoided. Implementing method 1000 can enhance user experience by providing disaggregation or aggregation results on the client computer quickly without a need to wait for server processing results.

The various systems and techniques described herein may be implemented in digital electronic circuitry, or in computer hardware, firmware, or in combinations of them. The various techniques may implemented as a computer program product, i.e., a computer program tangibly embodied in a non-transitory machine readable storage medium or device, for execution by, or to control the operation of, data processing apparatus, e.g., a programmable processor, a computer, or multiple computers.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magnetooptical disks, or optical disks or other non-transitory computer-readable storage device. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magnetooptical disks; and CDROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for modifying a spreadsheet data structure hosted on a client computing device, the method comprising:

providing an analyzer module as a plug-in or add-in to a spreadsheet application on a client computing device;

performing, using the analyzer module, a weighted disaggregation of data entered into a hierarchical cell of the spreadsheet, the hierarchical cell including references to a plurality of child cells, wherein the analyzer module stores a disaggregation algorithm and a set of special syntax characters defined to initiate execution of the disaggregation algorithm, the disaggregation algorithm including a disaggregation formula specifying hierarchical structure of data, wherein the weighted disaggregation is automatically executed using weights of existing disaggregation associated with the hierarchical cell upon detection of an identifier in the set of special syntax characters corresponding to another hierarchical cell; and parsing, by the analyzer module, content entered into the hierarchical cell to determine that the set of special syntax characters precedes an amount value in the entered content and accordingly initiate the disaggregation algorithm to execute the disaggregation formula to distribute the amount value as disaggregated amount values stored within the plurality of child cells in the spreadsheet data structure via the references, and replacing the entered content within the hierarchical cell by displaying an instantiation of the disaggregation formula that includes references to the plurality of child cells;

individually determining for and automatically applying to each child cell based on a value of the hierarchical cell, weights for each of the plurality of child cells associated with the hierarchical cell;

reweighing, based on the individually determining and automatically applying, each child cell; and displaying each reweighted child cell.

2. The method of claim 1, wherein the distribution formula specifies even disaggregation of the amount value over a number of the plurality of child cells, or an instruction for proportional disaggregation of the amount value over the number of plurality of child cells, with proportions corresponding to a reference disaggregation of a reference node, which is existing in the spreadsheet.

3. The method of claim 1 further comprising, when the content entered into the hierarchical cell does not include the set of special syntax characters, placing the amount value as the value of the hierarchical cell in the spreadsheet.

4. The method of claim 1, further comprising: identifying the child cells of hierarchical cell.

5. The method of claim 4, further comprising:
obtaining a count of the number of rows of the spreadsheet in which the child cells of the hierarchy cell are present; and
when the special syntax characters parsed by the analyzer module from the entered content are only the set of special characters corresponding to the instruction for even or uniform disaggregation, dividing the entered amount value by the count of the number of rows of the spreadsheet in which the child cells of the hierarchy cell are present and placing the result in each of the child cells.

6. The method of claim 5, further comprising:
when the special syntax characters parsed by the analyzer module from the entered content include a set of special characters corresponding to an instruction for proportional disaggregation,
locating a reference cell, child cells of the reference cell, and an existing disaggregation ("reference disaggregation") of the reference cell over child cells of the reference cell in the spreadsheet;
determining a ratio of each reference child cell value to the reference cell value for each reference child cell in the existing disaggregation of the reference cell; and
using the determined ratios for the reference child cells in the reference disaggregation to determine weights for a proportional disaggregation of the entered amount over the identified child cells of the hierarchy node.

7. The method of claim 5 further comprising determining a value of each identified child cell of the hierarchy cell including multiplying the entered amount value by the ratio determined for the corresponding child cell in the existing disaggregation of the reference cell.

8. The method of claim 5 further including inserting an automatically generated formula for each identified child cell of the hierarchy cell.

9. A computing device comprising:
a memory and a semiconductor-based processor, the memory and the processor forming one or more logic circuits configured to:
host a spreadsheet application to process a spreadsheet data structure in which a hierarchical cell of the spreadsheet including references to a plurality of child cells; and
an analyzer module coupled to the spreadsheet data structure, the analyzer module storing a disaggregation algorithm and a set of special syntax characters defined to initiate execution of the disaggregation algorithm to perform a weighted disaggregation of data entered into the hierarchical cell of the spreadsheet, the disaggregation algorithm including a disaggregation formula specifying hierarchical structure of data, wherein the weighted disaggregation is automatically executed using weights of existing disaggregation associated with the hierarchical cell upon detection of an identifier in the set of special syntax characters corresponding to another hierarchical cell the analyzer module configured to
parse content entered into the hierarchical cell to determine that the set of special syntax characters precedes an amount value in the entered content and accordingly initiate the disaggregation algorithm to execute the disaggregation formula to distribute the amount value as disaggregated amount values stored within the plurality of child cells in the spreadsheet data structure via the references, and replacing the entered content within the hierarchical cell by displaying an instantiation of the disaggregation formula that includes references to the plurality of child cells;
individually determine for and automatically apply to each child cell based on a value of the hierarchical cell, weights for each of the plurality of child cells associated with the hierarchical cell;
reweigh, based on the individually determined and automatically applied weights, each child cell; and
display each reweighted child cell.

10. The computing device of claim 9, wherein the distribution formula specifies even disaggregation of the amount value over a number of the plurality of child cells, or an instruction for proportional disaggregation of the amount value over the number of plurality of child cells, with proportions corresponding to a reference disaggregation of a reference node, which is existing in the spreadsheet.

11. The computing device of claim 9, wherein the analyzer module, when the content entered into the hierarchical cell does not include the set of special syntax characters, places the amount value as the value of the hierarchical cell in the spreadsheet.

12. The computing device of claim 9, wherein the analyzer module is configured to: identify the child cells of the hierarchy cell.

13. The computing device of claim 12, wherein the analyzer module is configured to:
obtain a count of the number of rows of the spreadsheet in which the child cells of the hierarchy cell are present; and
when the special syntax characters parsed by the analyzer module from the entered content are only the set of special characters corresponding to the instruction for even or uniform disaggregation, divide the entered amount value by the count of the number of rows of the spreadsheet in which the child cells of the hierarchy cell are present and placing the result in each of the child cells.

14. The computing device of claim 13, wherein the analyzer module is configured to:
determine that the special syntax characters include a set of special characters corresponding to an instruction for proportional disaggregation,
locate a reference cell, child cells of the reference cell, and an existing disaggregation ("reference disaggregation") of the reference cell over child cells of the reference cell in the spreadsheet;
determine a ratio of each reference child cell value to the reference cell value for each reference child cell in the existing disaggregation of the reference cell; and
use the determined ratios for the reference child cells in the reference disaggregation to determine weights for a proportional disaggregation of the entered amount over the identified child cells of the hierarchy node.

15. The computing device of claim 13, wherein the analyzer module is configured to:
    determine a value of each identified child cell of the hierarchy cell including multiplying the entered amount value by the ratio determined for the corresponding child cell in the existing disaggregation of the reference cell.

16. The computing device of claim 13, wherein the analyzer module is configured to:
    insert an automatically generated formula for each identified child cell of the hierarchy cell.

* * * * *